Figure 2:
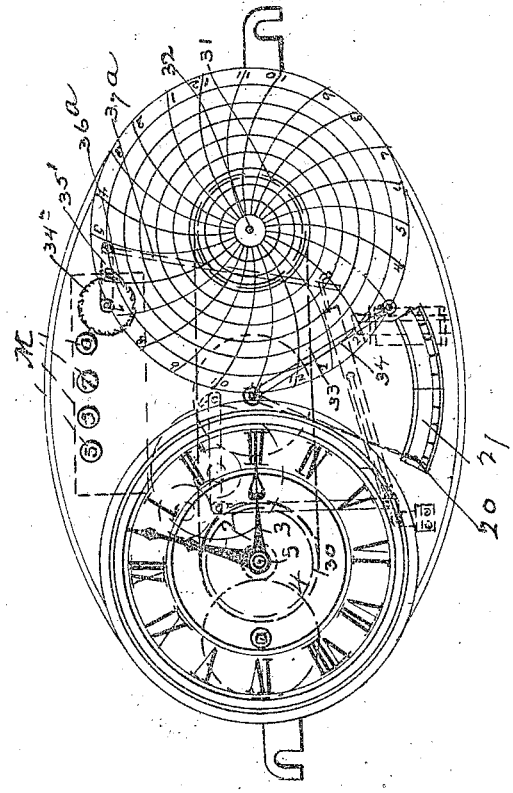

W. W. KING.
SPEED RECORDING DEVICE.
APPLICATION FILED OCT. 25, 1906.

1,042,561.

Patented Oct. 29, 1912.
3 SHEETS—SHEET 1.

Witnesses
A. H. Gilbert
Geo. S. Addams

Inventor
William W. King
by Wm. M. Monroe
Attorney

W. W. KING.
SPEED RECORDING DEVICE.
APPLICATION FILED OCT. 25, 1906.
1,042,561.
Patented Oct. 29, 1912.
3 SHEETS—SHEET 2.
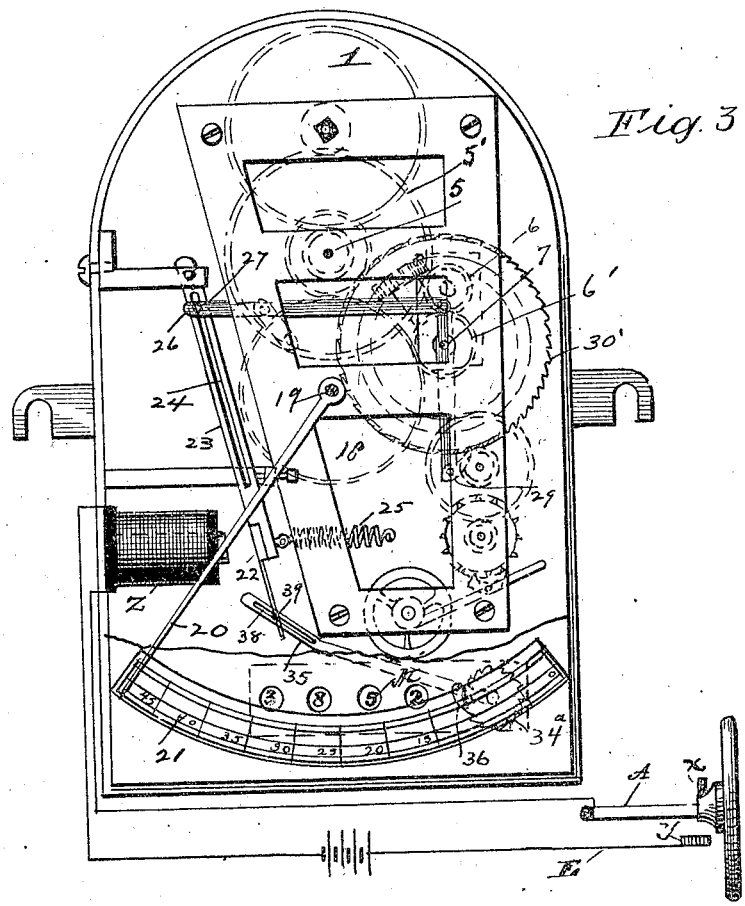
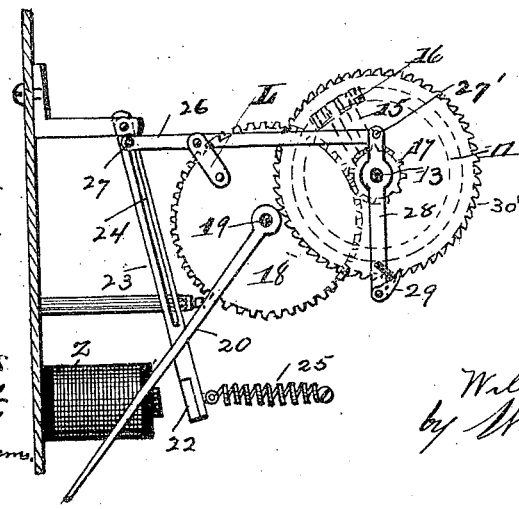

W. W. KING.
SPEED RECORDING DEVICE.
APPLICATION FILED OCT. 25, 1906.

1,042,561.

Patented Oct. 29, 1912.
3 SHEETS—SHEET 3.

Witnesses
A. H. Gibert
Geo. B. Addams

Inventor
William W. King
by Wm. M. Monroe
Attorney

UNITED STATES PATENT OFFICE.

WILLIAM W. KING, OF HUNTSBURG, OHIO.

SPEED-RECORDING DEVICE.

1,042,561.

Specification of Letters Patent. Patented Oct. 29, 1912.

Application filed October 25, 1906. Serial No. 340,471.

*To all whom it may concern:*

Be it known that I, WILLIAM W. KING, a citizen of the United States, and resident of Huntsburg, county of Geauga, State of Ohio, have invented certain new and useful Improvements in Speed-Recording Devices, of which I hereby declare the following to be a full, clear, and exact description, such as will enable others skilled in the art to which it appertains to make and use the same.

The objects of the invention are to provide a speed recording device designed especially for automobile use but capable of being put to all analogous uses upon all traction vehicles to indicate the momentary speed of rotating parts such as an engine or motor shaft or shaft of a driving wheel and further designed to give permanent and trip records for future reference. This device is operatable in connection with time clock mechanism and periodically acting instrumentalities connected with the rotating part, and is designed to indicate the exact speed in miles per hour during any period of 24 hours, and also to indicate the total distances traveled during a trip of any desired length of mileage and duration of time.

The objects are specifically to provide a vibrating finger which will remain quiescent while the speed of the vehicle is the same, and will change position one way or the other to indicate change in speed, as soon as the motor speed changes. I accomplish these objects by means of differential gearing, one of which is clock driven, and ratchet and lever mechanism periodically operated by the rotating part to be timed, whereby the speeds of the equalizing gears become relatively the same whatever changes take place in the speed of the rotating part, and a pointer operatively connected with a gear or pinion connecting the differential gears, is moved to correspond with the differential movement of the gears, and becomes quiescent at the moment the gear speed becomes equal, thereby indicating present speed. The mechanism whereby this result is accomplished, and the instrumentalities for obtaining a record of a trip and total mileage, with the various details of construction and combination and arrangement of the various parts are hereinafter described, shown in the accompanying drawings, and specifically pointed out in the claims.

Figure 1:
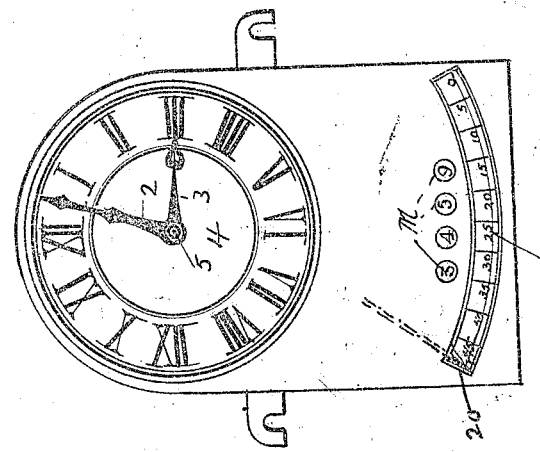
Figure 5:
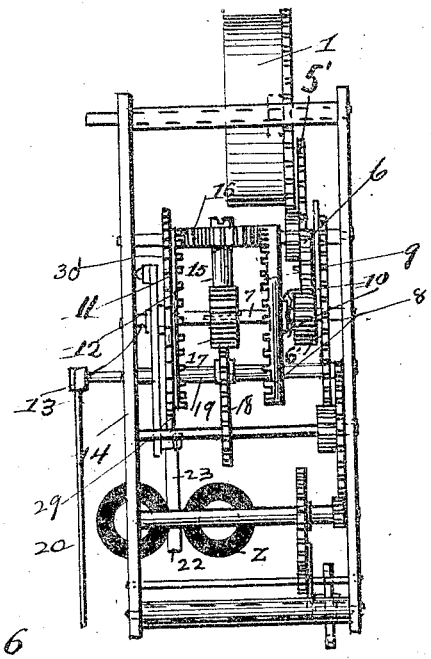
Figure 6:
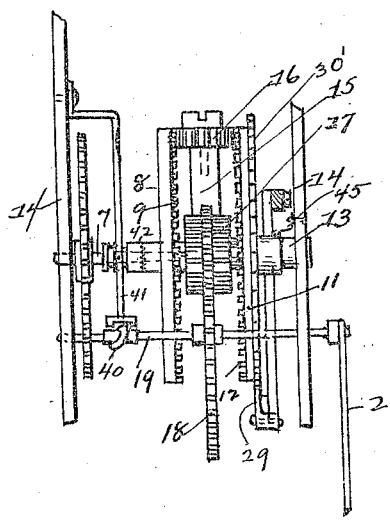
Figure 7:
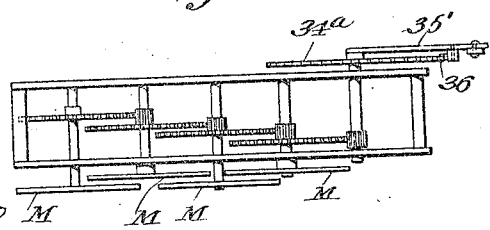

In the accompanying drawings, Figure 1 is an elevation of the device arranged to give a total mileage record, and to indicate the exact momentary speed at any one time; Fig. 2 is an elevation of a similar device adapted to give in addition a trip record indicating upon a card the speeds employed during any period of 12 hours of the day or night; Fig. 3 is an elevation of Fig. 1 with the cover of the inclosing case removed, showing the operating parts and their connections and a circuit adapted to be opened and closed by an automobile axle; Fig. 4 is a detail side view of the differential gearing, the ratchet and pawl mechanism, for operating one of the same, the engaging pinion or idler, the gear engaging the same upon which the indicator finger is mounted, and the automatically adjustable lever mechanism by means of which the differential gear speeds are equalized and the finger made stationary at the point of momentary speed; Fig. 5 is an end view of the device Fig. 6 is a top view of the device with the case removed and with the pinion 16 thrown back to show the gear 18. In this view a modified clutch is employed and certain of the gearing is omitted to preserve the clearness of the drawing, and Fig. 7 is a detail view illustrating a train of gearing hereinafter described.

In these views the clock movement shows main spring 1 hands 2 and 3 and face 4. A gear 5′ upon the main clock shaft 5 engages a pinion 6 and thence through pinion 6′ upon a parallel shaft 7, operates a wheel 8 having a marginal face gear 9 arranged to normally maintain the same speed as the clock when the vehicle is going. A mild friction device such as a spring pressed friction clutch 10 serves to rotate this wheel with the shaft when the motor is going but when the motor stops the wheel will stop also. 11 is a similar wheel to wheel 8 arranged with marginal teeth 12 facing the teeth 9 on the wheel 8 and is mounted loosely upon a stationary pin 13, secured to the casing 14. Between these gears 8 and 11 is pivoted upon shaft 7 an arm 15 upon the outer end of which is secured the pinion 16 which engages with both the face gears 12 and 9. Upon the "hub" of this arm 15 are the teeth of a pinion sector 17 which engage the spur gear 18 upon a parallel shaft 19. A pointer or indicator finger 20 is mounted upon this shaft 19, the outer extremity of which moves over the graduated arc 21 arranged to designate speed per hour from zero to the greatest capacity of the machine.

The wheels 8 and 11 and face gears 9 and 12 thereon are actuated one, 9, by the clock movement and the other 12 periodically by the movement of a rotating shaft in the machine, and as shown this part is the driving axle wheel, and it is designed that the speeds of the gears 9 and 12 shall normally remain equal whatever divergence there may be in the relative speeds of clock and machine. To accomplish this result and to change the location of the indicator arm to correspond with the speed of the machine the following instrumentalities are resorted to: In this instance an electric circuit E is provided which is periodically opened and closed by means of contacts $x$ and $y$ upon the axle A and some adjacent support, and operates the electric magnet Z. The armature 22 for this magnet is placed upon an arm 23, provided with a longitudinal slot 24 and a withdrawing spring 25. A link 26 is pivoted at one end 27 slidingly in this slot, and the other end 27' is pivotally attached to one end of the lever 28, fulcrumed upon the pin 13 and having a ratchet dog 29 pivoted upon its outer end. This dog engages the ratchet teeth 30' upon the outer edge of the wheel 11, and rotates that wheel and gear 12 to correspond with the speed of the machine axle A. Of course when the speed of the clock and axle of the machine are relatively unchanged, the wheels 8 and 11 will rotate at equal speeds and the pinion 16 between them will become an idler since the wheels 8 and 11 move in opposite directions. When however the speed of the axle falls below or rises above that of the clock the wheels will rotate at different speeds, that of the wheel 8 remaining the same, while the wheel 11 will vary in speed to correspond with the speed of the axle. The variation in speed in the wheel will therefore affect the idler 16 and cause it to turn circumferentially of the gears one way or the other and to travel upon the wheel 8, and hence change the position of the arm 15 and pinion 17, and hence the position of the gear 18 and indicator finger 20, and the finger 20 will move up or down the scale accordingly.

Since the indicator finger can only remain stationary when the wheels 8 and 11 travel at equal speed it is necessary that the gear wheel 18 which engages the pinion sector and operates the indicator finger 20 shall pull upon the link 26 by means of a short connecting strip L, and move the extremity of the link 26 up and down in the slot 24 in the armature arm 23 until the indicator arrives at the figure on the dial representing the exact speed at that time and until the movement of the ratchet lever and ratchet cause the movements of the wheels 8 and 11 to correspond in speed. At that time the pinion will become an idler and the finger will cease to move.

In the figures the extremity of the link 26 and pivot 27 are shown at the upper end of the slot 24 nearest the pivot of member 23, and hence the movement of the lever 28 and pawl 29 are slight or only one tooth at a time, as when the machine is moving at its greatest speed indicated as 50 miles per hour. As the speed lessens the pivot 27 falls in the armature arm and a greater sweep being given accordingly to the ratchet lever, the wheel 11 is rotated farther on each movement of the lever until the wheels 8 and 11 rotate again with equal speeds, and the pinion again becomes an idler and the finger is quiet. In this manner a vibrating finger is provided which will remain quiescent while the speed is unchanged, and will quickly change its position one way or the other to indicate changes in speed of the machine.

The arrangement with the differential gears and intermediate pinion to control the movements of the finger and the construction of the ratchet lever and armature arm and adjustable connecting link, to vary the throw of the ratchet in order to accord with the position of the finger permits the finger to remain stationary so long as the speeds of the motor and clock driven gears are the same, and causes the gears to return to equal speed as soon as the automatically acting adjustments cause the finger to indicate the present speed of the machine or motor. The speeds of the oppositely facing differential gears will always equalize as soon as the speed becomes constant and the finger will come to rest and will indicate on the scale the exact speed at that time.

It will be readily observed that a trip dial such as shown in Fig. 2 can be added to the device, and be rotated by means of sprocket wheels and chain 31 and 33, applied to the clock shaft 5, and to a spindle 32 on which the dial is mounted, thus giving the dial the movement of the clock.

A pencil finger 34 upon the same shaft as the indicator finger extends over the dial, and is thrown in and out to record varying speed in the same manner as the indicator finger.

The dial is graduated in concentric circles to indicate speed, and is marked with radially disposed arcs spaced to divisions of the day of 24 hours so that a complete record can be kept of a day's trip, showing speed during any one hour or half hour.

The ordinary total mileage record device for a year or any desired period such as shown in Fig. 3 at M can be connected with the armature arm by means of a ratchet wheel 34ª and rock arm and pawl 35 and 36. The extremity of the arm 35 can have a slot 38 therein, in which a pin 39 upon the extremity of the armature arm 23, plays, and hence the arm 35 will be operated by the armature at each stroke thereof, as shown in Fig. 3. The arm 35 is pivoted at P and moves the ratchet 34ª by means of the pawl 36 shown in Fig. 3, and the train of gears shown in Fig. 7.

In Fig. 2 a link 37ª connects the armature arm with the outer end of a pivoted lever 35' which carries a pawl 36ª, said pawl 36ª engaging ratchet wheel 34ª of counter M.

In Fig. 6 a positive clutch arrangement is shown for the face gear 8 driven by the clock shaft, so that when the motor stops the clock driven wheel 8 will stop. In this view 40 is an inclined disk upon the shaft 19 for the indicator finger and as this finger turns to the zero mark on the scale the disk will be turned to throw the spring clutch lever 41, and to release the clutch 42 on the face wheel 8, but as soon as the motor starts the finger shaft will turn to throw in the clutch again. Nice proportions of the parts being observed this device will work all right.

The wheel 11 is prevented from turning too freely on its shaft by means of a spring 45, which bears frictionally upon the hub of said wheel.

The pinion 17 is fast on the shaft 7, and the pinion 6' is loose on the shaft 7. The gears 11 and 9 are loose on the shaft 7. This makes the clutch 10 the only connection between the gear 9 and pinion 6'.

The object of the spring clutch is to permit the gears 9 and 11 to slip when the pinion 16 is thrown around in either direction far enough to strike against the gear 18. Otherwise the clock would stop when or soon after the motor had stopped.

In lieu of a spring clutch a positive clutch such as shown in Fig. 6 would answer the same purpose.

The clutch 42 is thrown by a spring arm 41 operated by an inclined disk or cam, on the shaft 19 of the gear 18. This is so arranged as to release the gear 9 before the pinion 16 will strike against the gear 18, in both directions of travel of the pinion 16. The possibility of striking the gear 18, is plainly visible in Fig. 4, and would occur if no means were found to prevent it and the clock would stop and there would be no means for registering.

Having described my invention what I claim as new and desire to secure by Letters Patent is:—

1. In combination, in a speed indicator for a wheeled vehicle, oppositely facing gears having a common axis and designed to rotate in opposite directions, clock mechanism operatively connected with one of said face gears, the other being a loose gear, a ratchet wheel on the loose face gear, a pinion between said face gears adapted to engage with both of them, a support for said pinion having a hub and rotatable on the axis of said face gears, a segmental pinion on said hub, an inclosing case for said mechanism, having a distance scale thereon, a gear adapted to engage with said segmental pinion, an indicator finger and shaft therefor, the movements of said segmental pinion being communicated to the said finger through said gear and shaft, an arm having a slot and adapted to vibrate once with each revolution of a vehicle wheel, means for giving said vibratory movement to said arm, a lever loose on the axis of the said ratchet wheel, and a pawl thereon, a link connecting the said lever and said vibrating arm, whereby the movements of said loose face gear correspond with the movements of said vehicle wheel, a pivoted strip connecting said finger supporting gear, and said link, and a pivot connecting said link and vibrating arm, said pivot being adjustable longitudinally and automatically in the slot in said arm, substantially as described.

2. In a speed indicator controlled by a vehicle wheel, a pair of face gears upon a common axis, and adapted to rotate independently of each other, means for rotating one of said gears at a regular predetermined rate, an idler between said gears, and adapted to engage with them both simultaneously, a bearing for said idler provided with a hub upon the axis of said face gears, said hub having a segmental gear, an indicator finger, a shaft and gear support therefor, the movements of which are controlled by said segmental gear, a lever and pawl and a ratchet wheel therefor, said ratchet wheel mounted upon the other face gear, a vibrating slotted arm the movements of which are controlled by said vehicle wheel, a link connecting said pawl, lever and vibrating arm and longitudinally adjustable in said arm and a pivoted piece connecting said finger supporting gear with said link, whereby the position of said link in said vibrating arm is affected by the movements of said segmental gear and finger supporting gear, and means controlled by the movements of a vehicle wheel for vibrating said vibrating arm once in each revolution of said wheel.

3. In a speed indicator for a vehicle having an axle and wheel and hub rotatable therewith, in combination with clock mechanism having a fixed speed, a face gear and shaft, a loose and opposed face gear, a fixed bearing pin therefor in said frame, an idler arranged to engage with both of said face gears, a ratchet wheel upon the said loose gear, a pawl and lever device therefor, a vibrating arm the movements of which are controlled by said axle whereby the said arm is given a periodical movement, an indicator finger operatively connected with said idler, connecting mechanism between said idler and finger, said idler being arranged to change position when the relative speed of the face gears changes, but to rotate in one position when their speeds are equal, and automatic mechanism controlled by the movements of said idler, whereby the throw of said lever and pawl are automatically adjusted to rotate said ratchet wheel and loose gear at the speed of the fixed speed gear as the position of the idler is changed whereby the finger will remain quiet in any changed position when the speed of the vehicle becomes constant, and means by which the movements of the vibrating arm are controlled by said axle.

WILLIAM W. KING.

Witnesses:
 WM. M. MONROE,
 GEO. S. ADDAMS.